United States Patent
Oishi

(10) Patent No.: US 11,673,983 B2
(45) Date of Patent: Jun. 13, 2023

(54) PHOTOCURABLE RESIN COMPOSITION AND A METHOD FOR PRODUCING AN ARTICLE

(71) Applicant: CANON KABUSHIKI KAISHA, Tokyo (JP)

(72) Inventor: Emi Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,867

(22) Filed: Jul. 28, 2021

(65) Prior Publication Data
US 2022/0033552 A1 Feb. 3, 2022

(30) Foreign Application Priority Data

Jul. 31, 2020 (JP) .............................. JP2020-130785

(51) Int. Cl.
| | | |
|---|---|---|
| C08F 2/46 | (2006.01) | |
| C08F 2/50 | (2006.01) | |
| C08G 61/04 | (2006.01) | |
| C08F 220/06 | (2006.01) | |
| B33Y 70/00 | (2020.01) | |
| B33Y 10/00 | (2015.01) | |
| C08F 222/20 | (2006.01) | |
| B29C 64/135 | (2017.01) | |
| C08K 5/5397 | (2006.01) | |

(52) U.S. Cl.
CPC .......... *C08F 220/06* (2013.01); *B29C 64/135* (2017.08); *B33Y 10/00* (2014.12); *B33Y 70/00* (2014.12); *C08F 2/50* (2013.01); *C08F 222/20* (2013.01); *C08K 5/5397* (2013.01)

(58) Field of Classification Search
CPC . B29C 64/135; B29C 64/129; C08F 222/103; C08F 222/20; C08F 220/2814; C09D 133/14; C09D 133/064; C08K 5/5397; B33Y 70/00; B33Y 10/00
USPC ................. 522/64, 6, 1, 189, 184, 71; 520/1
See application file for complete search history.

(56) References Cited

U.S. PATENT DOCUMENTS

2021/0363377 A1* 11/2021 Wada .................... C08F 279/02

FOREIGN PATENT DOCUMENTS

| JP | 2014040585 A | 3/2014 |
|---|---|---|
| JP | 2015063666 A | 4/2015 |
| JP | 2016180081 | * 10/2016 |
| JP | 2020505255 A | 2/2020 |
| JP | 2020122053 | * 8/2020 |
| WO | 2018144501 A1 | 8/2018 |

OTHER PUBLICATIONS

Kawada et al, JP 2016-180081 Machine Translation, Oct. 13, 2016 (Year: 2016).*
Kaneya et al, JP 2020-122053 Machine Translation, Aug. 13, 2020 (Year: 2020).*

* cited by examiner

*Primary Examiner* — Jessica Whiteley
(74) *Attorney, Agent, or Firm* — Canon U.S.A., Inc., IP Division

(57) ABSTRACT

A curable resin composition which provides a cured product excellent in impact resistance and flexural modulus and has a low viscosity comprising a component (A), a component (B) and a component (C). The component (A) is a compound represented by formula (1),

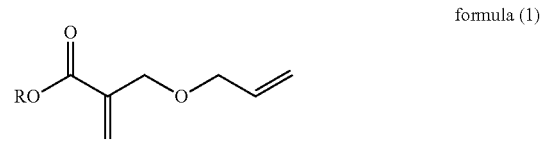

formula (1)

In formula (1), R is hydrogen or a hydrocarbon group having 1 to 4 carbon atoms. The hydrocarbon group optionally has a substituent. The component (B) is a compound having one or more caprolactone modified structures and two or more radically polymerizable groups per molecule, and the component (C) is a radical polymerization initiator.

20 Claims, 1 Drawing Sheet

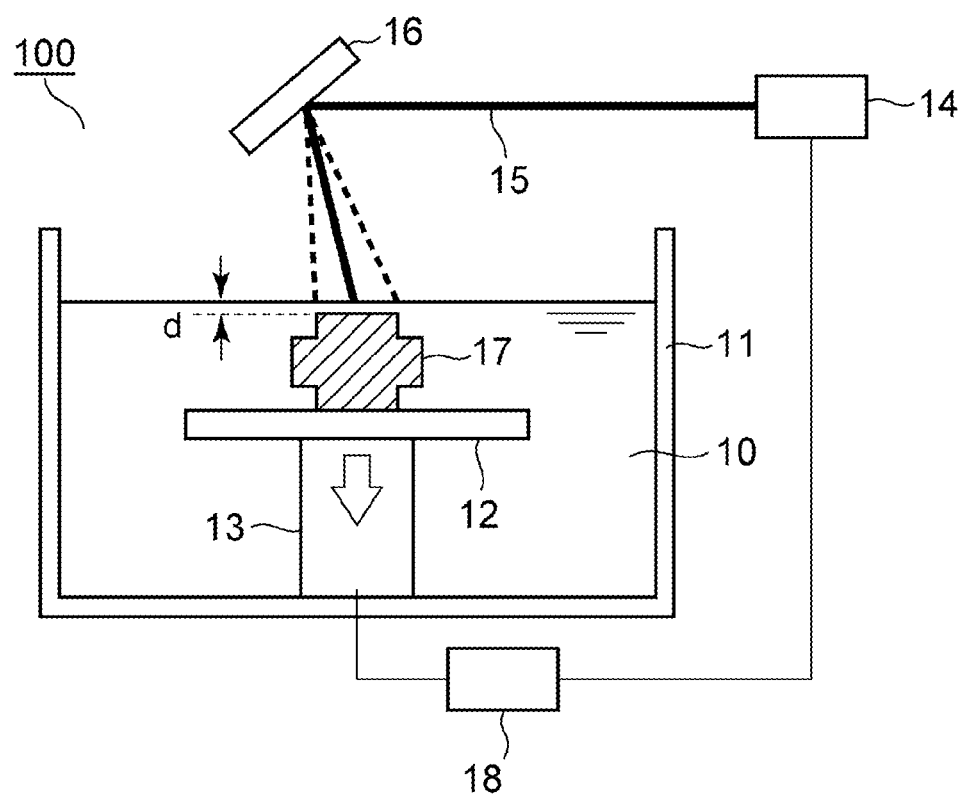

PHOTOCURABLE RESIN COMPOSITION AND A METHOD FOR PRODUCING AN ARTICLE

BACKGROUND OF THE INVENTION

Field of the Invention

The present disclosure relates to a photocurable resin composition, a cured product, and a method for producing an article.

Description of the Related Art

In recent years, against the background of diversification of shaping materials and evolution of equipment technology, three-dimensional lamination shaping (Additive Manufacturing (AM)) has been increasingly used as a means of manufacturing products. Among Additive Manufacturing, there are a shaping method called a liquid layer photopolymerization method (Vat Photopolymerization) and a stereolithography method. In these shaping methods, a liquid photocurable resin is cured by a laser beam or a lamp to form a three-dimensional shape, and high-precision and fine-enough shaping is possible. On the other hand, a shaping made of a photocurable resin is required to have high mechanical strength and environmental resistance, and material properties such as flexural modulus, impact resistance and heat resistance have been improved.

Japanese Patent Application Laid-Open No. 2014-40585 discloses that a curable composition comprising a radically polymerizable monomer and a polyfunctional radically polymerizable compound provides a curable composition having flexibility, high hardness and heat resistance.

Japanese Patent Application Laid-Open No. 2020-505255 discloses that a shaping having mechanical properties similar to those of a thermoplastic resin is obtained by using an ink containing a cyclized polymerizable monomer and an oligomer curable material in shaping by a 3D printer.

However, depending on the application of the product, further improvement in mechanical properties is required, and specifically, compatibility of impact resistance and flexural modulus is required. In addition, a low liquid viscosity is required from the viewpoints of prevention of entrainment of bubbles and liquid level leveling for use in high-precision and fine-enough shaping. The composition disclosed in Japanese Patent Application Laid-Open No. 2014-40585 can achieve a low liquid viscosity, but does not provide sufficient impact resistance. The composition disclosed in Japanese Patent Application Laid-Open No. 2020-505255 provides a cured product excellent in mechanical properties such as flexural elasticity, but the liquid viscosity thereof is not sufficiently low and is not suitable for shaping. An aspect of the present disclosure is to provide a curable resin composition which provides a cured product excellent in impact resistance and flexural modulus and has a low viscosity.

SUMMARY OF THE INVENTION

The present inventors have studied diligently to achieve the above aspects, and have completed the present disclosure relating to the photocurable resin composition to form a polymer containing a five-membered ring ether by radical polymerization which comprises a monofunctional acrylic monomer (Component (A)) and a polyfunctional radically polymerizable compound (Component (B)) containing a caprolactone modified structure.

Component (A) and component (B) form a copolymer structure by radical polymerization.

In the cured product after polymerization, a five-membered ring ether formed by polymerization of the component (A) and a caprolactone modified structure in the component (B) have a function of absorbing impact, and a crosslinked structure formed by a polyfunctional radically polymerizable compound such as the component (B) realizes high elastic modulus of the polymer. In particular, the inventors have found that five-membered ring ethers, caprolactone modified structures and distances between crosslinking points are necessary factors to achieve both the free volume and high elastic modulus required for shock absorption.

The photocurable resin composition according to the present embodiment is characterized by comprising
 a component (A);
 a component (B); and
 a component (C),
 wherein the component (A) is a compound represented by formula (1)

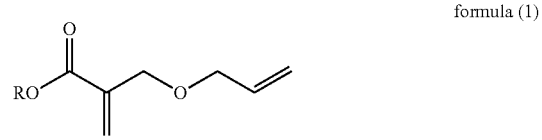

formula (1)

wherein in formula (1), R is hydrogen or a hydrocarbon group having 1 to 4 carbon atoms, and the hydrocarbon group optionally has a substituent,
 wherein the component (B) is a compound having one or more caprolactone modified structures and two or more radically polymerizable groups per molecule,
 wherein the component (C) is a radical polymerization initiator,
 wherein X, the number of caprolactone modified structures in the photocurable resin composition, is calculated by the following formula (i),
 wherein Y, the number of crosslinking groups in the photocurable resin composition, is calculated by the following formula (ii):

$$X = x_B n_B / (x_A + x_B n_B + x_B m_B) \times 100 \qquad (i)$$

$$Y = x_B m_B / (x_A + x_B n_B + x_B m_B) \times 100 \qquad (ii),$$

wherein $x_A$ is mole fraction of the component (A),
 wherein $x_B$ is mole fraction of the component (B),
 wherein $n_B$ is the number of caprolactone modified structures per molecule of the component (B),
 wherein $m_B$ is the number of radically polymerizable groups per molecule of the component (B), and
 wherein X is 9 to 30 inclusive and Y is 7 to 20 inclusive.

Further features of the present disclosure will become apparent from the following description of exemplary embodiments with reference to the attached drawing.

BRIEF DESCRIPTION OF THE DRAWINGS

FIGURE is a schematic diagram showing a configuration example of a shaping apparatus using a free liquid level method.

DESCRIPTION OF THE EMBODIMENTS

The photocurable resin composition (hereinafter referred to as "composition" in some cases) according to the present embodiment will be described in detail.

<Component (A): Monofunctional 2-(allyloxymethyl) acrylic Acid or its Ester>

The monofunctional 2-(allyloxymethyl)acrylic acid or its ester as the component (A) is represented by formula (1).

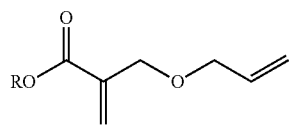

formula (1)

In formula (1), R is hydrogen or a hydrocarbon group having 1 to 4 carbon atoms, and the hydrocarbon group may be a saturated or unsaturated hydrocarbon group, and may have a substituent. The hydrocarbon group having 1 to 4 carbon atoms may be straight chain, branched chain or cyclic, and may contain an ether bond. Examples of the hydrocarbon group having 1 to 4 carbon atoms include methyl, ethyl, n-propyl, isopropyl, n-butyl, sec-butyl, tert-butyl, vinyl, allyl, methallyl, crotyl, cyclopropyl, cyclobutyl, methoxymethyl, methoxyethyl, ethoxymethyl, ethoxyethyl, vinyloxyethyl, epoxy, and oxetanyl. A hydrocarbon group having 1 to 2 carbon atoms is preferably used as the hydrocarbon group having 1 to 4 carbon atoms. The substituent which the hydrocarbon group may have is, for example, a chain unsaturated hydrocarbon group such as a vinyl group, an allyl group, a metallyl group, a crotyl group, or the like; cyclic ether structures such as epoxy, glycidyl, and oxetanyl groups; alkoxy groups such as methoxy, ethoxy, or methoxyethoxy groups; alkylthio groups such as methylthio groups and ethylthio groups; acyl groups such as acetyl and propionyl groups; acyloxy group such as an acetyloxy group or a propionyloxy group; alkoxycarbonyl groups such as methoxycarbonyl and ethoxycarbonyl groups; alkylthiocarbonyl groups, such as methylthiocarbonyl and ethylthiocarbonyl groups; halogen atoms such as fluorine, chlorine, bromine, and iodine atoms; ureido group; amide group; cyano group; hydroxyl group; trimethylsilyl group, and the like.

As the component (A), a commercial product, for example, AOMA (manufactured by Nippon Shokubai Co., Ltd.) or the like can be cited.

The impact resistance of the cured product is improved by a five-membered ring ether formed by polymerization of the component (A). Therefore, the content of the component (A) is preferably 50 mass % or more and less than 90 mass %, preferably 60 mass % or more and 85 mass % or less, more preferably 70 mass % or more and 85 mass % or less, based on the total amount of the composition.

<Component (B): Polyfunctional Radically Polymerizable Compound>

The polyfunctional radically polymerizable compound of the component (B) is a compound having one or more caprolactone modified structures and two or more radically polymerizable groups per molecule. The "caprolactone modified structure" is a ring-opened structure of ε-caprolactone, that is, a structure represented by formula (2).

—C(=O)—(CH$_2$)$_5$—O— (2)

The component (B) may be any of a linear compound, a branched compound and a cyclic compound, and the caprolactone modified structure contained in the component (B) may be contained in a main chain, a side chain or a cyclic chain. When the compound comprises a plurality of caprolactone modified structures, the caprolactone modified structure may form a repeating structure such as a polycaprolactone modified structure in the molecule. When the compound has a plurality of caprolactone modified structures, the caprolactone modified structures may exist apart from each other. In particular, the caprolactone modified structures may be spaced apart from each other in a structure derived from a branched or cyclic compound such as pentaerythritol, dipentaerythritol, trimethylolpropane, ditrimethylolpropane, isocyanurate, and the like.

The radically polymerizable group contained in component (B) is preferably a group having a carbon-carbon double bond, and more preferably an acryloyl group or a methacryloyl group.

As the component (B), a commercially available product can be used, for example, DPCA-60, DPCA-120 (all manufactured by Nippon Kayaku Co., Ltd.), and the like can be cited.

<X: The Number of Caprolactone Modified Structures and Y: The Number of Crosslinking Groups in Photocurable Resin Composition>

The component (B) is preferably contained such that the number X of the caprolactone modified structures in the photocurable resin composition is 9 to 30, and the number Y of the crosslinked groups in the photocurable resin composition is 7 to 20. The calculation methods for X and Y will be described below.

X is calculated by the following formula (i) and Y is calculated by the following formula (ii):

$$X = x_B n_B / (x_A + x_B n_B + x_B m_B) \times 100 \quad (i)$$

$$Y = x_B m_B / (x_A + x_B n_B + x_B m_B) \times 100 \quad (ii),$$

wherein $x_A$ is mole fraction of the component (A),
wherein $x_B$ is mole fraction of the component (B),
wherein $n_B$ is the number of caprolactone modified structures per molecule of the component (B), and
$m_B$: the number of radically polymerizable groups per molecule of the component (B)

When the composition contains a polyfunctional radically polymerizable compound different from the component (B) as the component (D), X is calculated by the following formula (iii), and Y is calculated by the following formula (iv):

$$X = x_B n_B / (x_A + x_B n_B + x_B m_B + x_D m_D) \times 100 \quad (iii)$$

$$Y = x_B m_B + x_D m_D / (x_A + x_B n_B + x_B m_B + x_D m_D) \times 100 \quad (iv),$$

wherein $x_A$ is mole fraction of the component (A),
wherein $x_B$ is mole fraction of the component (B),
wherein $x_D$ is mole fraction of the component (D),
wherein $n_B$: the number of caprolactone modified structures per molecule of the component (B),
wherein $m_B$ is the number of radically polymerizable groups per molecule of the component (B), and
wherein $m_D$ is the number of radically polymerizable groups per molecule of the component (D).

When the composition contains a monofunctional radically polymerizable compound different from the component (A) as the component (E), X is calculated by the following formula (v), and Y is calculated by the following formula (vi):

$$X = x_B n_B / (x_A + x_E + x_B n_B + x_B m_B) \times 100 \quad (v)$$

$$Y = x_B m_B / (x_A + x_E + x_B n_B + x_B m_B) \times 100 \quad (vi),$$

wherein $x_A$ is mole fraction of component (A),
wherein $x_B$ is mole fraction of component (B),
wherein $x_E$ is mole fraction of component (E), wherein $n_B$ is the number of caprolactone modified structures per molecule of the component (B), and wherein $m_B$ is the number of radically polymerizable groups per molecule of the component (B).

The mole fraction of each component is calculated from the added amount (mass) and the molecular weight of each blended component of the composition. The mole fraction is the ratio of the amount of each component to the sum of the amounts of all components, and is a dimensionless amount having no unit.

When more than one kind of compound is contained as component (B), $x_B n_B$ is the sum of the product of the mole fraction calculated for each compound and the number of caprolactone modified structures in one molecule, and $x_B m_B$ is the sum of the product of the mole fraction calculated for each compound and the number of radically polymerizable groups. The same applies to $x_D m_D$ in the case where one or more compounds are further contained as component (D).

The range of X in which the composition produces a shaping having impact resistance and elastic modulus that can withstand practical use is 9 to 30, preferably 9 to 16. The caprolactone modified structure contained in component (B) has an impact absorbing effect, but when X is less than 9, the impact resistance is lowered, and when X is more than 30, the elastic modulus is lowered.

The range of Y in which the composition produces a shaping having impact resistance and elastic modulus that can withstand practical use is 7 to 20, preferably 7 to 16. A high flexural modulus can be developed when Y is 7 or more, but when Y is larger than 20, the breaking point when an impact is applied is increased and the impact resistance is lowered.

The composition satisfying both of the above ranges of X and Y, that is, X is 9 to 30 inclusive and Y is 7 to 20 inclusive provides a cured product having a small deformation amount to a load while securing a free volume necessary for shock absorption after radical polymerization. When the range of X is 9 to 16 inclusive and the range of Y is 7 to 16 inclusive, the composition provides a cured product having particularly excellent flexural modulus and impact resistance.

<Component (C): Radical Polymerization Initiator>

The radical polymerization initiator can be appropriately selected according to the curing conditions (such like irradiation wavelength and dose) of the curable resin.

Polymerization initiators that generate radical species upon light irradiation include, but are not limited to, 2,4,6-trimethylbenzoyl-diphenylphosphine oxide, 2-benzyl-2-dimethylamino-1-(4-morpholinophenyl)-1-butanone, 1-hydroxycyclohexylphenyl ketone, 2-hydroxy-2-methyl-1-phenyl-propane-1-one, bis (2,4,6-trimethylbenzoyl)-phenylphosphine oxide, 4-phenylbenzophenone, 4-phenoxybenzophenone, 4,4'-diphenylbenzophenone, 4,4'-diphenoxybenzophenone, and the like.

The polymerization initiators for generating radical species by heat include, but are not limited to, azo compounds such as azobisisobutyl nitrile (AIBN), peroxides such as benzoyl peroxide, tert-butyl peroxy pivalate, tert-butyl peroxy neohexanoate, tert-hexyl peroxy neohexanoate, tert-butyl peroxy neodecanoate, tert-hexyl peroxy neodecanoate, cumyl peroxy neohexanoate, and cumyl peroxy neodecanoate.

The radical polymerization initiator can be used in only one type or in combination of two or more types. The amount of the radical polymerization initiator added is preferably in the range of 0.01 to 10.00 parts by mass based on 100 parts by mass of the radical polymerizable compound. The addition ratio of the radical polymerization initiator may be appropriately selected according to the amount of light irradiation and the additional heating temperature. In addition, it may be adjusted according to the target average molecular weight of the obtained polymer.

<Component (D): A Polyfunctional Radically Polymerizable Compound Different from Component (B)>

To the photocurable resin composition of the present disclosure, a polyfunctional radically polymerizable compound other than the component (B) can be added as the component (D) within a range that does not cause a significant deterioration in the performance of the cured product.

The component (D) is the polyfunctional(meta)acrylates such like, but not limited to, 1,4-butanediol di(meta)acrylate, 1,5-pentanediol di(meta)acrylate, 1,6-hexanediol di(meta)acrylate, 1,7-heptanediol di(meta)acrylate, 1,8-octanediol di(meta)acrylate, diethylene glycol di(meta)acrylate, neopentyl glycol di(meta)acrylate, tetraethylene glycol di(meta)acrylate, tripropylene glycol di(meta)acrylate, ethoxylated bisphenol A di(meta)acrylate, tricyclodecanedimethanol di(meta)acrylate, trimethylolpropane triacrylate, tris(2-hydroxyethyl)isocyanurate triacrylate, pentaerythritol triacrylate, pentaerythritol tetraacrylate, dipentaerythritol pentaacrylate, dipentaerythritol hexaacrylate, dioxane glycol diacrylate, 9,9-bis [4-(2-hydroxyethoxy)phenyl] fluorenediacrylate, ethylene glycol di(meta)acrylate, propylene glycol di(meta)acrylate, cyclohexane-1,4-dimethanol di(meta)acrylate, cyclohexane-1,3-dimethanol di(meta)acrylate, dioxane glycol diacrylate, dicyclopentanyl di(meta)acrylate, and the like. Only one kind of component (D) may be added or a plurality of components may be combined at the same time so that the mechanical properties of the cured product do not deteriorate.

<Component (E): Monofunctional Radically Polymerizable Compound Different from Component (A)>

To the photocurable resin composition of the present disclosure, a monofunctional radically polymerizable compound other than the component (A) can be added as the component (E) within a range that does not cause a significant deterioration in the performance of the cured product.

The component (E) includes the monofunctional (meta) acrylate such like, but not limited to, 4-tert-butylcyclohexanol (meta) acrylate, 3,3,5-trimethylcyclohexanol (meta) acrylate, isobornyl (meta) acrylate, cyclic trimethylolpropane formal (meta) acrylate, 3-hydroxy-1-(meta) acryloyloxyadamantane, 1-adamantyl (meta) acrylate, 2-methyl-2-adamantyl (meta) acrylate, dicyclopentaenyl (meta) acrylate, 2-isopropyladamantan-2-yl (meta) acrylate, tetrahydrodicyclopentadienyl (meta) acrylate, alpha-(meta) acryloxy-gamma-butyrolactone, 2-hydroxy-o-phenylphenolpropyl (meta) acrylate, acryloyl morpholine, diethylacrylamide, isopropylacrylamide, hydroxyethylacrylamide, cyclohexyl (meta) acrylate, methyl (meta) acrylate, 2-ethylhexyl (meta) acrylate, 2-hydroxyethyl (meta) acrylate, 2-hydroxypropyl (meta) acrylate, lauryl (meta) acrylate, stearyl (meta) acrylate, isooctyl (meta) acrylate, tetrahydrofurfuryl (meta) acrylate, isobornyl (meta) acrylate, benzyl (meta) acrylate, phenoxyethyl (meta) acrylate, phenoxypolyethylene glycol (meta) acrylate, phenylglycidyl (meta) acrylate, lauryl (meta) acrylate, isodecyl (meta) acrylate, stearyl (meta) acrylate, isooctyl (meta) acrylate, tridecyl (meta) acrylate, ethoxydiethylene glycol (meta) acrylate, methoxyditripropylene glycol (meta) acrylate, tricyclodecane (meta) acrylate, dicyclopentadienoxyethyl (meta) acrylate, dicyclopentenyl acrylate, dicyclopentenyloxyethyl acrylate, dicyclopentenyloxymethacrylate, dicyclopentanyl acrylate, dicyclopentanyl methacrylate, and the like. Only one kind of component (E) may be added or a plurality of components may be combined at the same time so that the mechanical properties of the cured product do not deteriorate.

<Component (F): Other Polymerizable Compounds>

Other polymerizable materials may be added as the component (F) in order to adjust the viscosity or add functions. Other polymerizable compounds are not particularly limited and include, for example, cationic polymerizable compounds such as monofunctional or two-or-more functional epoxy or oxetane compounds.

The monofunctional or two-or-more functional epoxy or oxetane compounds may include, but are not limited to, hydrogenated bisphenol A diglycidyl ether, hydrogenated bisphenol F diglycidyl ether, hydrogenated bisphenol AD diglycidyl ether, hydrogenated bisphenol Z diglycidyl ether, cyclohexanedimethanol diglycidyl ether, tricyclodecanedimethanol diglycidyl ether, 3,4-epoxycyclohexylmethyl-3', 4'-epoxycyclohexanecarboxylate, 3,4-epoxy-1-methylcyclohexyl-3,4-epoxy-1-methylcyclohexanecarboxylate, 6-methyl-3,4-epoxycyclohexylmethyl-6-methyl-3,4-epoxycyclohexanecarboxylate, 3,4-epoxy-3-methylcyclohexylmethyl-3,4-epoxy-3-methylcyclohexanecarboxylate, 3,4-epoxy-5-methylcyclohexylmethyl-3,4-epoxy-5-methylcyclohexanecarboxylate, 2-(3,4-epoxycyclohexyl-5, 5-spiro-3,4-epoxy) cyclohexane-metadioxane, bis (3,4-epoxycyclohexylmethyl) adipate, 3,4-epoxy-6-methylcyclohexylcarboxylate, dicyclopentadienediepoxide, ethylenebis (3,4-epoxycyclohexanecarboxylate), dioctyl epoxyhexahydrophthalate, di-2-ethylhexyl epoxyhexahydrophthalate, epsilon-caprolactone modified 3',4'-epoxycyclohexylmethyl 3,4-epoxycyclohexanecarboxylate, 1,2-epoxy-4-(2-oxiranyl) cyclohexane adduct of 2,2-bis (hydroxymethyl)-1-butanol, bis (3,4-epoxycyclohexyl) methane, 2,2-bis (3,4-epoxycyclohexyl) propane, 1,1-bis (3,4-epoxycyclohexyl) ethane, alpha-pinene oxide, campholenic aldehyde, limonene monooxide, limonene dioxide, 4-vinylcyclohexene monooxide, 4-vinylcyclohexenedioxide, 3-hydroxymethyl-3-methyloxetane, 3-hydroxymethyl-3-ethyl oxetane, 3-hydroxymethyl-3-propyl oxetane, 3-hydroxymethyl-3 n-butyl oxetane, 3-hydroxymethyl-3-propyl oxetane, and the like.

When the cationically polymerizable compound is added, a polymerization initiator for generating cationic species by light irradiation, a photoacid generator or a photobase generator may be added to the composition to promote the polymerization reaction of the cationically polymerizable compound. Iodonium (4-methylphenyl) [4-(2-methylpropyl) phenyl]-hexafluorophosphate is cited as a suitable polymerization initiator for generating cationic species by light irradiation, but is not limited thereto. Examples of the photoacid generator include, but are not limited to, triarylsulfonium hexafluoroantimonate, triphenylphenacylphosphonium tetrafluoroborate, triphenylsulfonium hexafluoroantimonate, bis-[4-(diphenylsulfonio) phenyl] sulfide bisdihexafluoroantimonate, bis-[4-(di4'-hydroxyethoxyphenyl sulphonium) phenyl]sulfide bisdihexafluoroantimonate, bis-[4-(diphenylsulfonio) phenyl] sulfide bisdihexafluorophosphate, diphenyliodonium tetrafluoroborate, and the like.

<Other Additives>

To the composition of the present disclosure, a polymerization inhibitor, a photosensitizer, a light resistant stabilizer, a heat resistant stabilizer, an antioxidant, a chain transfer agent, a curing aid, or the like can be added within a range where no significant deterioration in the performance of the cured product occurs.

The polymerization inhibitor includes a hydroquinone-based polymerization inhibitor such as hydroquinone, hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether and hydroquinone monoheptyl ether, and a phenol-based polymerization inhibitor having a substituent such as 3-(3,5 di-tert-butyl-4 hydroxyphenyl) propionate. However, since a hydroquinone-based polymerization inhibitor such as hydroquinone or a benzoquinone-based polymerization inhibitor such as benzoquinone may turn yellow by UV irradiation, they are suitable for obtaining a thin-film cured product such as a coating. The polymerization inhibitor described above can be used as the polymerization inhibitor during the reaction or storage, but the present invention is not limited thereto. The polymerization inhibitor is added preferably in the range of 0.01 mass % to 1.00 mass % with respect to the composition. Further, only one polymerization inhibitor may be used, or two or more kinds of polymerization inhibitors may be used in combination. Concretely, it is preferable to use a hydroquinone-based polymerization inhibitor in combination because of less coloring.

Photosensitizers include benzophenone, 4,4-diethylaminobenzophenone, 1-hydroxycyclohexylphenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropane-1-one, acylphosphine oxide, and the like. The amount of the photosensitizer added is preferably in the range of 0.01 mass % to 10.00 mass % with respect to the composition.

Light stabilizers are not particularly limited as long as they do not significantly affect the properties of the cured product, and include benzotriazole-based compounds such as 2-(2H-benzotriazole-2-yl)-p-cresol, 2-(2H-benzotriazole-2-yl)-4,6-bis (1-methyl-iphenylethyl) phenol, 2-[5-chloro (2H)-benzotriazole-2-yl]-4-methyl-6-(tert-butyl) phenol, 2-(2H-benzotriazole-2-yl)-4,6-di-tert-pentylphenol, 2-(2H-benzotriazole-2-yl)-4-(1,1,3,3-Tetramethylbutyl) phenol, 2,2'-methylrenebis[6-(2H-benzotriazole-2-yl)]-4-(1,1,3,3-Tetramethylbutyl) phenol, 2-(2H-benzotriazole-2-yl)-6-dodecyl-4-methylphenol, triazine-based compound such as ethyl 2-cyano-3,3-diphenylacrylate, 2-cyano-3,3-diphenylacrylic acid 2-ethylhexyl ester, and the like, or benzophenone-based compounds such as octabenzone, 2,2'-4,4'-tetrahydrobenzophenone, and the like. In some cases, a light-resistant stabilizer may serve as a photosensitizer, in which case no photosensitizer may be added. The light stabilizer is added preferably in the range of 0.01 mass % to 10.00 mass % with respect to the composition.

The heat-resistant stabilizer is not particularly limited as long as it does not significantly affect the characteristics of the cured product, and includes alkyl esters of 7 to 9 carbon atoms having side chains such like pentaerythritol tetrakis [3-(3,5 di-tert-butyl-4 hydroxyphenyl)] propionate, octadecyl-3-(3,5 di-tert-butyl-4 hydroxyphenyl) propionate and 3,5-bis (1,1-dimethylethyl)-4 hydroxybenzenepropanoic acid, hindered phenolic compounds such like 4,6-bis (octylthiomethyl)-o-cresol, 4,6-bis (dodecylthiomethyl)-o-cresol, ethylene bis(oxyethylene)bis[3-(5-tert-butyl-4 hydroxy-m-tolyl)] propionate and hexamethylenebis [3-(3,5 di-tert-butyl-4 hydroxyphenyl)]propionate, phosphorus compounds such like tris (2,4-di-tert-butylphenyl) phosphite, and sulfur compounds such like dioctadecyl-3,3'-thiodipropionate. The heat-resistant stabilizer is added preferably in the range of 0.01 mass % to 10.00 mass % with respect to the composition.

The antioxidant is not particularly limited as long as it does not significantly affect the properties of the cured product, and hindered amine compounds such as bis (2,2,6,6-Tetramethyl-4-piperidyl) sebacate, bis (1,2,2,6,6-pentamethyl-4-piperidyl) [[3,5-bis(1,1-dimethylethyl)-4-hydroxyphenyl] methyl] butylmalonate, and the like can be cited. The antioxidant is added preferably in the range of 0.01 mass % to 10.00 mass % with respect to the composition.

Chain transfer agents and curing aids include such like beta-mercaptopropionic acid, 2-ethylhexyl-3-mercaptopropionate, n-octyl-3-mercaptopropionate, methoxybutyl-3-mercaptopropionate, stearyl-3-mercaptopropionate, 1-butanethiol, cyclohexanethiol, cyclohexyl 3-mercaptopropionate, 1-decanethiol, 2,4-diphenyl-4methyl 1-pentene, 1-dodecanethiol, dodecyl 3-mercaptopropionate, 2-ethylhexyl mercaptoacetate, 2-ethylhexyl 3-mercaptopropionate, ethyl mercaptoacetate, 1-hexadecanethiol, hexyl 3-mercaptopropionate, 2-mercaptoethanol, 3-mercapto-1,2-propanediol, mercaptoacetic acid, sodium 2-mercaptoethane sulfonate, 3-mercaptopropionic acid, methyl mercaptoate, mercaptosuccinic acid, methyl 3-mercaptopropionate, octadecyl 3-mercaptopropionate, octyl 3-mercaptopropionate, 1-octanethiol, 1-octadecanethiol, tridecyl 3-mercaptopropionate, and thiophenol, a polyfunctional thiol such like bis (2-mercaptoethyl) sulfide, 3,6-dioxa-1,8-octanedithiol, trimethylolpropanetris (3-mercaptopropionate), 1,4-butanediol-bis (thioglycolate) pentaerythritol tetra (3-mercaptopropionate), 1,4-benzenethiol, 3,7 dithia-1,9-nonanol, DL-1,4-dimercapto-2,3-butanediol, 1,5-dimercaptnaphthalene, dithioerythritol, ethylene bis thioglycolate, pentaerythritol tetrakismercaptoacetate, tris-(3-mercaptopropionyloxyethyl)-isocyanurate, tetraethylene glycol bis (3-mercaptopropionate), dipentaerythritol hexakis (3-mercaptopropionate), 3,3'-thiodipropionic acid, dithiodipropionic acid, and laurylthiopropionic acid (dodecylthiopropionic acid), commercial products such like TS-G, C3TS-G, TA-G, LDAIC (manufactured by Shikoku Chemical Co., Ltd.), Kalens MTPE1, BD1, NR1 and TPMB (manufactured by Showa Denko Co., Ltd.).

Further, a dye, a filler or the like may be added to adjust the viscosity or add a function. The filler is not particularly limited as long as the mechanical properties of the cured product are not deteriorated. The type of the filler is a metal salt, a metal oxide, polymer fine particles, rubber particles, inorganic fibers, organic fibers, carbon, and the like. The metal oxide includes, but is not limited to, silicon oxide, titanium oxide, aluminum oxide, and the like. The polymer fine particles include, but are not limited to, acrylic fine particles, polystyrene fine particles, nylon fine particles, and the like. The rubber particles include, but are not limited to, butadiene rubber particles, styrene-butadiene rubber copolymer particles, acrylonitrile-butadiene copolymer rubber particles, or saturated rubber particles obtained by hydrogenating or partially hydrogenating the said diene rubbers, cross-linked butadiene rubber particles, isoprene rubber particles, chloroprene rubber particles, natural rubber particles, silicon rubber particles, ethylene/propylene/diene monomer ternary copolymer rubber particles, acrylic rubber particles, acrylic/silicone composite rubber particles, and the like. The organic fibers include, but are not limited to, nylon fibers and cellulose nanofibers.

<Viscosity>

As long as the viscosity (liquid viscosity of the uncured composition measured in an atmosphere at 23° C.) is less than 1,000 cps (mPa-s), shaping by Vat Photopolymerization or a stereolithography method is possible. However, when the viscosity is 200 cps or more, bubbles may be formed in the cured product and the leveling of the resin liquid surface takes time. Thus, the composition of the present disclosure achieves a viscosity (Liquid viscosity of the uncured composition measured in an atmosphere at 23° C.) of less than 200 cps. More preferably, the viscosity is 100 cps or less, even more preferably 10 cps or less. Since the liquid viscosity is low, the forming of bubbles can be suppressed, and further, the handling property can be improved by shortening the leveling time of the resin liquid surface and simplifying the washing process performed after the shaping. Further, the composition having such viscosity can be suitably used for spraying of an ink jet system or the like.

<Method for Preparing Composition>

The method for preparing the composition of the present invention is not particularly limited, and the most convenient method is to weigh all the materials and then heat stir them. However, if there is a concern about polymerization by heating, a polymerization inhibitor may be added where necessary. In addition, when it is difficult to mix uniformly only by heating, the mixture may be prepared by dissolving all the materials in a solvent such as acetone and then distilling off the solvent. Further, agitation by a disperser such as an ultrasonic homogenizer, a ball mill, or a disk mill may be used.

<Method for Shaping Article>

In the curing step of the composition, the shape of the cured product and the curing method are not particularly limited. Examples of the curing method include a method of applying the composition to the substrate and then irradiating the substrate with light, a method of injecting the composition into a mold and then irradiating the mold with light, and an optical stereoscopic shaping method (stereolithography) in which a thin-film cured product is laminated.

The method of applying the composition to the substrate is not particularly limited. For example, a contact transfer type coating apparatus such as a roll coater, a reverse coater, a bar coater, and a slit coater, or a non-contact type coating apparatus such as a spinner (Rotary coating apparatus) and a curtain flow coater may be used, and the coating film may be formed by coating the composition on the substrate to a desired film thickness.

Any of the known stereolithography (optical shaping method) and apparatus can be used as a method for performing stereolithography using the composition of the present disclosure. Preferably, the method comprises laminating a cured layer obtained by photocuring a composition to a predetermined thickness. A typical example of a preferred stereolithography method is a method having a step of repeating a step of curing a curable resin composition with a predetermined thickness based on slice data generated based on three-dimensional shape data of a production object (steric model). There are two main types of stereolithographic methods, the free liquid level method and the regulated liquid level method.

FIGURE shows a configuration example of the shaping apparatus 100 using the free liquid level method. The shaping apparatus 100 has a tank 11 for containing a liquid curable resin composition 10. A shaping stage 12 is provided inside the tank 11 so as to be driven in a vertical direction by a driving shaft 13. An active energy ray 15 for curing a curable resin composition 10 emitted from a light source 14 is irradiated with a galvanomirror 16 controlled by a control part 18 according to slice data to scan the surface of a tank 11. In FIGURE, the scanning range is indicated by a thick broken line.

The thickness "d" of the photocurable resin composition 10 cured by the active energy beam 15 is a value determined based on the setting at the time of generation of the slice data and affects the accuracy of the obtained article (reproducibility of three-dimensional shape data of article to be shaped). The thickness d is achieved by the control unit 18 controlling the driving amount of the drive shaft 13.

First, the control unit 18 controls the drive shaft 13 based on the setting, and the curable resin composition with a thickness d is supplied onto the stage 12. A liquid curable resin composition on a stage 12 is selectively irradiated with active energy rays 15 based on slice data to form a cured layer having a desired pattern. Next, by moving the stage 12 in the direction of the hollow arrow, an uncured curable resin composition having a thickness d is supplied to the surface of the cured layer. An active energy ray 15 is irradiated based on the slice data to form a cured product integrated with the previously formed cured layer. By repeating the layered curing process, the desired three-dimensional shaping 17 can be obtained.

When a cured layer having a predetermined shape pattern is formed by irradiating an active energy ray to a surface supplied with a curable resin composition, the resin can be cured by a stippling method or a line drawing method by using a light energy ray narrowed in a point shape or a line shape. Alternatively, the composition may be cured by irradiating an active energy ray in a planar shape through a planar drawing mask formed by arranging a plurality of minute optical shutters such as a liquid crystal shutter or a digital micromirror shutter.

As with the free liquid level method, shaping by the regulated liquid level method is also preferable. In the configuration of the shaping apparatus using the regulated liquid level method, the stage 12 of the shaping apparatus 100 shown in FIGURE is provided so as to pull shaping 17 up to the liquid level, and the light irradiation means is provided below the tank 11. Typical examples of shaping by the regulated liquid level method are as follows. First, the supporting surface of the supporting stage provided so as to be movable up and down and the bottom surface of the tank containing the curable resin composition are disposed so as to have a predetermined distance from each other, and the curable resin composition is supplied between the supporting surface of the supporting stage and the bottom surface of the tank. Then, the curable resin composition between the stage support surface and the bottom surface of the tank is selectively irradiated with light according to the slice data from the bottom surface side of the tank containing the curable resin composition by a laser light source or a projector. By the irradiation of the light, the curable resin composition between the stage support surface and the bottom surface of the tank is cured to form a solid cured layer. The cured layer is then pulled away from the bottom of the vessel by raising the support stage.

Subsequently, the height of the support stage is adjusted so that the distance between the cured layer formed on the support stage and the bottom surface of the tank becomes a predetermined distance. A new cured layer is formed between the cured layer and the bottom surface of the tank by supplying a curable resin composition between the bottom surface of the tank and the cured layer and irradiating light according to the slice data, as described above. By repeating the process multiple times, it is possible to obtain the shaping 17 in which a plurality of cured layers are integrally laminated.

The shaped 17 thus obtained is taken out of the tank 11, the unreacted curable resin composition remaining on its surface is removed, and post-processing is performed as necessary to obtain a target article.

Post-Processing includes cleaning, post-curing, cutting, polishing, assembly, and the like. As the cleaning agent used for cleaning, an alcoholic organic solvent represented by alcohols such as isopropyl alcohol and ethyl alcohol can be used. Alternatively, ketone-based organic solvents such as acetone, ethyl acetate and methyl ethyl ketone, and aliphatic organic solvents such as terpenes may be used.

After cleaning, post curing may be performed by light irradiation, heat irradiation, or both, where necessary. The post-cure cures an unreacted curable resin composition which may remain on the surface and inside of the shaping, can suppress the stickiness of the surface of the three-dimensional shaping, and can improve the initial strength of the three-dimensional shaping.

Examples of the active energy ray include ultraviolet rays, electron rays, X-rays, radiation, and high-frequency waves. Among them, ultraviolet rays having a wavelength of 300 nm to 430 nm are preferably used from an economical viewpoint, and an ultraviolet laser (for example, semiconductor pumped solid-state lasers, Ar lasers, He—Cd lasers, and the like), a high pressure mercury lamp, an extra-high pressure mercury lamp, a mercury lamp, a xenon lamp, a halogen lamp, a metal halide lamp, an ultraviolet LED (light emitting diode), a fluorescent lamp, or the like can be used as the light source. Among the above, the ultraviolet laser is preferably adopted because it has excellent light condensability, can shorten the shaping time by increasing the energy level, and can provide high shaping accuracy.

<Application>

The composition of the present disclosure can be suitably used for a three-dimensional lamination shaping method, particularly a stereolithography. The cured product of the present disclosure and the shaping obtained by a 3D printer can be widely used in the field of stereolithography. Typical applications include, but are not limited to, prototype models of industrial products, design models, working models, base models for producing molds, direct molds for prototype molds, service parts, housings, parts of industrial products, and the like. In particular, the composition of the present disclosure can be used in the manufacture of housings and parts of industrial products requiring durability because of its elastic modulus, impact resistance, and heat resistance.

EXAMPLES

Examples 1 to 6 and Comparative Examples 1 to 5

<Components>

The components used in examples and comparative examples are shown in Table 1 together with the molecular weight, the number of caprolactone modified structures per molecule, and the number of radically polymerizable groups per molecule.

TABLE 1

| Component | | Compound name | Manufacturing company | Product name | Molecular weight | The number of caprolacton | The number of radically polymerizable |
|---|---|---|---|---|---|---|---|
| (A) | A-1 | 2-(Allyloxymethyl) acrylic acid | Nippon Shokubai | AOMA | 141 | 0 | 1 |
| (B) | B-1 | Polyfunctional monomer | Nippon Kayaku | KAYARAD DPCA-60 | 1,263 | 6 | 6 |
| | B-2 | Polyfunctional monomer | Nippon Kayaku | KAYARAD DPCA-120 | 2,277 | 12 | 6 |
| (C) | C-1 | 2,4,6 Trimethylbenzoyl-diphenylphosphine oxide | IGMResins B.V. | Omnirad TPO-H | 348 | 0 | 0 |
| (D) | D-1 | Dipentaerythritol hexa acrylate | Nippon Kayaku | KAYARAD DPHA | 578 | 0 | 6 |

<Preparation of the Composition>

Each component was blended at the blending ratio (parts by mass) shown in Table 2 and mixed uniformly to produce a composition.

<Preparation of Cured Product for Test Specimen>

The cured product was prepared by the following method using the prepared composition. First, a mold having a length of 80 mm, a width of 10 mm, and a thickness of 4 mm was sandwiched between two pieces of quartz glass, and the composition was poured therein. The poured composition was irradiated with 10 mW/cm2 of ultraviolet rays for 120 seconds by an ultraviolet irradiation device (EX 250 manufactured by HOYA CANDEO OPTRONICS Co., Ltd.) and an illuminometer (UIT-250 manufactured by USHIO ELECTRIC Co., Ltd.) for a total of 6 times by changing the front and back of the irradiation surface, and was released to obtain a cured product (total energy irradiated was 7200 mJ/cm2). Further, the obtained cured product was placed in a heating oven at 50° C. for 1 hour, placed in a heating oven at 100° C. for 1 hour, and subjected to heat treatment to obtain a cured product for the test piece.

<Evaluation of Flexural Modulus>

The flexural modulus of the obtained specimen was measured using a universal testing machine (INSTRON Model 5581) in accordance with JIS K 7171. Under the condition of 2 mm/min, the flexural modulus was calculated from the stress gradient of the specified strain interval (0.05% to 0.25%). The flexural modulus was evaluated by the following criteria. The results are shown in Table 2.

A (very good): The flexural modulus is 2.5 GPa or more.
B (good): The flexural modulus is 1.5 GPa or more and less than 2.5 GPa.
C (defective): the flexural modulus is less than 1.5 GPa.

<Evaluation of Impact Resistance>

A notch of 2 mm in depth and 45° was formed in the center of the obtained test piece by a notch forming machine ("Notching Tool A-4" manufactured by Toyo Seiki Corp.) in accordance with JIS K 7111. The specimen is then fractured by using an impact tester ("IMPACT TESTER IT" manufactured by Toyo Seiki Corp.) at an energy of 2 J from the back of the notch. The energy required for fracture was calculated from the angle at which the hammer swung up after fracture when the hammer started swinging from the 150° position, and the Charpy impact strength was used as an index of impact resistance. The impact resistance was evaluated by the following criteria. The results are shown in Table 2.

A (very good): Charpy impact strength is 7 kJ/m2 or more.
B (good): Charpy impact strength is 5 kJ/m2 or more and less than 7 kJ/m2.
C (defective): Charpy impact strength is less than 5 kJ/m2.

<Evaluation of Heat Resistance>

The heat resistance of the obtained specimens was tested using a deflection temperature under load testing machine (product name "No. 533 HDT Tester 3M-2" manufactured by Toyo Seiki Corp.) in accordance with JIS K 7191-2. The temperature was raised from 25° C. to 2° C. per minute at a bending stress of 1.80 MPa. The temperature at which the deflection of the test piece reached 0.34 mm was used as the deflection temperature under load as an index of heat resistance. Heat resistance was evaluated based on the following criteria. The results are shown in Table 2.

A (very good): the deflection temperature under load is 60° C. or higher.
B (good): the deflection temperature under load is 45° C. or higher and less than 60° C.
C (defective): the deflection temperature under load is less than 45° C.

<Measurement of Liquid Viscosity>

The liquid viscosity of the uncured composition was measured using an ultrasonic vibration viscometer ("VM-10 A-L" manufactured by Seconic Corp.) under an atmosphere of 23° C. The liquid viscosity was evaluated according to the following criteria. The results are shown in Table 2.

A (very good): liquid viscosity less than 200 cps.
B (Good): Liquid viscosity is 200 cps or more and less than 1,000 cps.

TABLE 2

| | | | Examples | | | | | | Comparative Examples | | | | |
|---|---|---|---|---|---|---|---|---|---|---|---|---|---|
| | | | 1 | 2 | 3 | 4 | 5 | 6 | 1 | 2 | 3 | 4 | 5 |
| Composition (parts by mass) | Component (A) | A-1 | 80 | 80 | 85 | 70 | 70 | 60 | 80 | 90 | 60 | 90 | 45 |
| | Component (B) | B-1 | 20 | 0 | 15 | 30 | 0 | 0 | 0 | 10 | 40 | 0 | 0 |
| | | B-2 | 0 | 20 | 0 | 0 | 30 | 40 | 0 | 0 | 0 | 10 | 55 |
| | Component (C) | C-1 | 1 | 1 | 1 | 1 | 1 | 1 | 1 | 1 | 1 | 1 | 1 |
| | Component (D) | D-1 | 0 | 0 | 0 | 0 | 0 | 0 | 20 | 0 | 0 | 0 | 0 |
| | | X | 12.6 | 14.3 | 9.4 | 15.4 | 21.6 | 28.4 | 0 | 6.7 | 29.4 | 7.5 | 38.5 |
| | | Y | 12.6 | 7.2 | 9.4 | 15.4 | 10.8 | 14.2 | 27.3 | 6.7 | 29.4 | 3.7 | 19.2 |
| Evaluation | Flexural modulus | | A | A | A | A | A | B | A | A | B | A | C |
| | Impact resistance | | A | A | B | B | B | B | C | C | C | C | C |

TABLE 2-continued

| | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| Heat resistance | A | A | A | A | B | B | A | A | A | B | C |
| Viscosity | A | A | A | A | A | A | A | A | A | A | A |

As shown in Table 2, when Examples 1 to 6 using a compound (component (B)) having a caprolactone modified structure and two or more radically polymerizable groups in one molecule as a polyfunctional radically polymerizable compound are compared with Comparative Example 1 using a polyfunctional radical polymer D-1 having no caprolactone modified structure in the molecule, the cured products of Examples 1 to 6 have high impact resistance.

Further, when Examples 1 to 6 in which X is in the range of 9 to 30 inclusive and Y is in the range of 7 to 20 inclusive are compared with Comparative Examples 2 to 5 in which X and Y are not in the range, it has been clarified that high flexural modulus and impact resistance are compatible in Examples 1 to 6. The liquid viscosity was 10 cps or less in each case.

From the above results, it has become clear that the composition of the present disclosure can provide a cured product having high impact resistance, flexural modulus and heat resistance, and can be suitably used for stereolithography because of its low liquid viscosity in an uncured state.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130785, filed Jul. 31, 2020, which is hereby incorporated by reference herein in its entirety.

What is claimed is:

1. A photocurable resin composition comprising:
    a component (A);
    a component (B); and
    a component (C),
    wherein the component (A) is a compound represented by formula (1)

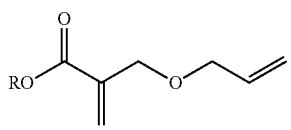

formula (1)

wherein in formula (1), R is hydrogen or a hydrocarbon group having 1 to 4 carbon atoms, and the hydrocarbon group optionally has a substituent,
wherein the component (B) is a compound having one or more caprolactone modified structures and two or more radically polymerizable groups per molecule,
wherein the component (C) is a radical polymerization initiator,
wherein X, the number of caprolactone modified structures in the photocurable resin composition, is calculated by the following formula (i), wherein Y, the number of crosslinking groups in the photocurable resin composition, is calculated by the following formula (ii):

$$X = x_B n_B / (x_A + x_B n_B + x_B m_B) \times 100 \quad (i)$$

$$Y = x_B m_B / (x_A + x_B n_B + x_B m_B) \times 100 \quad (ii),$$

wherein $x_A$ is mole fraction of the component (A),
wherein $x_B$ is mole fraction of the component (B),
wherein $n_B$ is the number of caprolactone modified structures per molecule of the component (B),
wherein $m_B$ is the number of radically polymerizable groups per molecule of the component (B), and
wherein X is 9 to 30 inclusive and Y is 7 to 20 inclusive, and
wherein the content of the component (A) is 50% or more and less than 90 mass %.

2. The photocurable resin composition according to claim 1, wherein the flexural modulus of the photocurable resin composition is 1.5 GPa or more, and wherein Charpy impact strength of photocurable resin composition is 5 kJ/m2 or more.

3. The photocurable resin composition according to claim 1, wherein the content of the component (A) is 60 mass % or more and 85 mass % or less.

4. The photocurable resin composition according to claim 1, wherein said X is in a range of 9.4 to 28.4 inclusive, and said Y is in a range of 7.2 to 15.4 inclusive.

5. The photocurable resin composition according to claim 1, wherein a viscosity of the photocurable resin composition is less than 200 cps.

6. The photocurable resin composition according to claim 1, wherein the component (B) comprises a group having a carbon-carbon double bond as the radical polymerizable group.

7. The photocurable resin composition according to claim 6, wherein the group having the carbon-carbon double bond is an acryloyl group or a methacryloyl group.

8. A cured product obtained by curing the photocurable resin composition according to claim 1.

9. A photocurable resin composition comprising:
    a component (A);
    a component (B);
    a component (C); and
    a component (D),
    wherein the component (A) is a compound represented by formula (1),

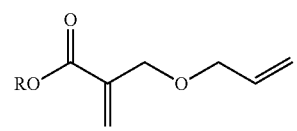

formula (1)

wherein in formula (1), R is hydrogen or a hydrocarbon group having 1 to 4 carbon atoms, and the hydrocarbon group optionally has a substituent, wherein the component (B) is a compound having one or more caprolactone modified structures and two or more radically polymerizable groups per molecule, wherein the component (C) is a radical polymerization initiator, wherein the component (D) is a polyfunctional radically polymerizable compound which is different from the component (B), wherein X, the number of caprolactone modified structures in the photocurable resin composition, is calculated by the following formula (iii), wherein Y, the number of crosslinking groups in the photocurable resin composition, is calculated by the following formula (iv):

$$X = x_B n_B / (x_A + x_B n_B + x_B m_B + x_D m_D) \times 100 \quad \text{(iii)}$$

$$Y = x_B m_B + x_D m_D / (x_A + x_B n_B + x_B m_B + x_D m_D) \times 100 \quad \text{(iv)},$$

wherein $x_A$ is mole fraction of the component (A),
wherein $x_B$ is mole fraction of the component (B),
wherein $x_D$ is mole fraction of the component (D),
wherein $n_B$ is the number of caprolactone modified structures per molecule of the component (B),
wherein $m_B$ is the number of radically polymerizable groups per molecule of the component (B),
wherein $m_D$ is the number of radically polymerizable groups per molecule of the component (D), and
wherein X is 9 to 30 inclusive and Y is 7 to 20 inclusive, and
wherein the content of the component (A) is 50 mass % or more and less than 90 mass %.

10. The photocurable resin composition according to claim 9, wherein the flexural modulus of the photocurable resin composition is 1.5 GPa or more, and wherein Charpy impact strength of photocurable resin composition is 5 kJ/m² or more.

11. The photocurable resin composition according to claim 9, wherein the content of the component (A) is 60 mass % or more and 85 mass % or less.

12. The photocurable resin composition according to claim 9, wherein X is in a range of 9.4 to 28.4 inclusive, and Y is in a range of 7.2 to 15.4 inclusive.

13. The photocurable resin composition according to claim 9 of which viscosity is less than 200 cps.

14. The photocurable resin composition according to claim 9, wherein the component (B) comprises a group having a carbon-carbon double bond as the radical polymerizable group.

15. The photocurable resin composition according to claim 14, wherein the group having the carbon-carbon double bond is an acryloyl group or a methacryloyl group.

16. A cured product obtained by curing the photocurable resin composition of claim 9.

17. A method for producing an article comprising:
repeating a step of forming a cured layer by photocuring a photocurable resin composition with a predetermined thickness multiple times,
wherein the photocurable resin composition comprises a component (A), a component (B) and a component (C),
wherein the component (A) is a compound represented by formula (1),

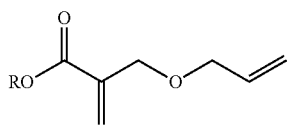

formula (1)

wherein in formula (1), R is hydrogen or a hydrocarbon group having 1 to 4 carbon atoms, and the hydrocarbon group optionally has a substituent, wherein the component (B) is a compound having one or more caprolactone modified structures and two or more radically polymerizable groups per molecule, and wherein the component (C) is a radical polymerization initiator, wherein X, the number of caprolactone modified structures in the photocurable resin composition, is calculated by the following formula (i), wherein Y, the number of crosslinking groups in the photocurable resin composition, is calculated by the following formula (ii):

$$X = x_B n_B / (x_A + x_B n_B + x_B m_B) \times 100 \quad \text{(i)}$$

$$Y = x_B m_B / (x_A + x_B n_B + x_B m_B) \times 100 \quad \text{(ii)},$$

wherein $x_A$ is mole fraction of the component (A),
wherein $x_B$ is mole fraction of the component (B),
wherein $n_B$ is the number of caprolactone modified structures per molecule of the component (B),
wherein $m_B$ is the number of radically polymerizable groups per molecule of the component (B), and
wherein said X is 9 to 30 inclusive and Y is 7 to 20 inclusive.

18. The method of manufacturing an article according to claim 17, wherein said method comprises:
disposing the curable resin composition at a predetermined thickness; and
curing the curable resin composition by irradiating the curable resin composition with light energy based on a slice data of a three-dimensional model.

19. A method for producing an article comprising:
repeating, for multiple times, a step of forming a cured layer by photocuring a photocurable resin composition with a predetermined thickness,
wherein the photocurable resin composition comprises a component (A), a component (B), a component (C) and a component (D),
wherein the component (A) is a compound represented by formula (1),

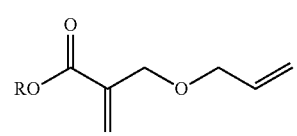

formula (1)

wherein in formula (1), R is hydrogen or a hydrocarbon group having 1 to 4 carbon atoms, and the hydrocarbon group optionally has a substituent, wherein the component (B) is a compound having one or more caprolactone modified structures and two or more radically polymerizable groups per molecule, wherein the component (C) is a radical polymerization initiator, wherein the component (D) is a polyfunctional radically polymerizable compound which is different from the component (B), wherein X, the number of caprolactone modified structures in the photocurable resin composition, is calculated by the following formula (iii), wherein Y, the number of crosslinking groups in the photocurable resin composition, is calculated by the following formula (iv):

$$X = x_B n_B / (x_A + x_B n_B + x_B m_B + x_D m_D) \times 100 \quad \text{(iii)}$$

$$Y = x_B m_B + x_D m_D / (x_A + x_B n_B + x_B m_B + x_D m_D) \times 100 \quad \text{(iv)},$$

wherein $x_A$ is mole fraction of the component (A),
wherein $x_B$ is mole fraction of the component (B),
wherein $x_D$ is mole fraction of the component (D),
wherein $n_B$ is the number of caprolactone modified structures per molecule of the component (B),
wherein $m_B$ is the number of radically polymerizable groups per molecule of the component (B),
wherein $m_D$ the number of radically polymerizable groups per molecule of the component (D), and
wherein X is 9 to 30 inclusive and Y is 7 to 20 inclusive.

20. The method of manufacturing an article according to claim 19, wherein said method comprises:
    disposing the curable resin composition at a predetermined thickness; and
    curing the curable resin composition by irradiating the curable resin composition with light energy based on a slice data of a three-dimensional model.

\* \* \* \* \*